United States Patent
Briggs et al.

[11] Patent Number: 6,143,170
[45] Date of Patent: Nov. 7, 2000

[54] OIL RECOVERY SYSTEM

[76] Inventors: David L. Briggs, 8543 Framewood Dr., Newburgh, Ind. 47630; John K. Clement, Jr., 3472 Brookside Rd., Toledo, Ohio 43606

[21] Appl. No.: 09/014,300

[22] Filed: Jan. 27, 1998

[51] Int. Cl.[7] .............................. B01D 41/02; B08B 7/00
[52] U.S. Cl. ...................... 210/210; 210/179; 210/241; 210/360.1; 210/924; 134/107
[58] Field of Search ................................ 210/502.1, 505, 210/924, 241, 360.1, 157, 179, 210, 244, 923; 134/105, 107

[56] References Cited

U.S. PATENT DOCUMENTS

| | | | |
|---|---|---|---|
| 2,727,629 | 12/1955 | Hertrich | 210/210 |
| 3,356,218 | 12/1967 | Grudoski | 210/241 |
| 3,679,058 | 7/1972 | Smith | 210/924 |
| 3,688,906 | 9/1972 | Ferrara | 210/179 |
| 3,827,985 | 8/1974 | De Haan et al. | 210/179 |
| 3,962,083 | 6/1976 | Goldman | 210/242 |
| 4,120,788 | 10/1978 | Ellis | 210/30 |
| 4,157,781 | 6/1979 | Maruyama | 233/23 |
| 4,277,569 | 7/1981 | Walker | 521/92 |
| 4,356,275 | 10/1982 | Wagner et al. | 521/136 |
| 4,395,332 | 7/1983 | Klein | 210/496 |
| 4,395,336 | 7/1983 | Eng | 210/693 |
| 4,416,782 | 11/1983 | Kerres | 210/634 |
| 4,454,044 | 6/1984 | Klein | 210/663 |
| 4,636,317 | 1/1987 | Lewis | 210/748 |
| 4,664,812 | 5/1987 | Klein | 210/679 |
| 4,919,646 | 4/1990 | Perdriat | 494/1 |
| 5,156,743 | 10/1992 | Muncrief | 210/671 |
| 5,165,821 | 11/1992 | Fischer et al. | 405/63 |
| 5,192,455 | 3/1993 | Marcel, Jr. | 210/787 |
| 5,227,072 | 7/1993 | Brinkley | 210/671 |
| 5,229,006 | 7/1993 | Brinkley | 210/671 |
| 5,232,607 | 8/1993 | Lundquist | 210/787 |
| 5,403,478 | 4/1995 | Brinkley | 210/242.4 |
| 5,407,575 | 4/1995 | Vinsonhaler | 210/484 |
| 5,423,985 | 6/1995 | Addeo et al. | 210/242.4 |
| 5,514,286 | 5/1996 | Crosby | 210/241 |
| 5,643,449 | 7/1997 | Brinkley | 210/242.4 |
| 5,700,558 | 12/1997 | Bopp | 428/316.6 |

FOREIGN PATENT DOCUMENTS 9001198  12/1991  Netherlands.

OTHER PUBLICATIONS

Advertising brochure entitled "Food Processing Products", 6 pgs., Bock Engineered Products, Inc., Toledo, OH (published before 1995).

Primary Examiner—David A. Simmons
Assistant Examiner—Frank M. Lawrence
Attorney, Agent, or Firm—Luedeka, Neeley & Graham PC

[57] ABSTRACT

A portable system for recovering oil-based fluids from sorbent articles containing oil-based fluids, the system including a motor vehicle and a self-balancing centrifuge having a housing and a foraminous rotatable basket removably attached to a spindle in the housing, the centrifuge being attached to the vehicle for transport to a remote site, the basket having a solid base having a mass sufficient to provide self-balancing rotation of the basket and the basket being configured for receiving a plurality of the sorbent articles therein, wherein rotation of the centrifuge basket applies sufficient centrifugal force to the sorbent articles to cause removal of oil-based fluids therefrom such that the fluids travel from the basket into an annular area between the basket and the housing and from the housing to a fluid recovery tank and the sorbent articles are essentially fluid free.

14 Claims, 3 Drawing Sheets

OIL RECOVERY SYSTEM

FIELD OF THE INVENTION

The invention relates generally to oil-based fluid recovery devices and apparatus for reclaiming oil-based fluid from the recovery devices.

BACKGROUND OF THE INVENTION

Absorbents are commonly used for recovery of oil or hydrocarbon based fluids. For example, U.S. Pat. No. 5,227,072 describes recovering oil spills on water or on floors using sorbent articles of resilient man-made fibers to absorb the oil. The sorbent articles are generally reusable after treatment to remove absorbed oil. Treatment of the articles enables recovery of oil for reuse and/or recycle and reuse of the sorbent articles.

The use of reusable absorbent articles is advantageous for recovering oils from spills in that significant cost reductions may be achieved as compared to the use of non-reusable articles. Also, reusable sorbents avoid incineration and/or land disposal problems associated with the use of non-reusable sorbents. However, previous apparatus and methods for removing absorbed oil from reusable absorbent devices desires improvement. For example, such apparatus are typically located remotely from the spill or recovery sites and thus the sorbent articles must be transported, sometimes over great distances. This is particularly true when sorbents are used to recover hydrocarbons from spills such as may occur on lakes or rivers. It is generally not cost effective to provide such apparatus at all possible recovery spill sites due to the cost of the apparatus. Furthermore, the expense, labor, time and inconvenience incurred in transporting the sorbent articles and absorbed oil to the location of the apparatus make reuse of sorbent devices less attractive.

Accordingly it is an object of the present invention to provide an improved system for recovering oil or hydrocarbon based fluids.

A further object of the present invention is to provide a system of the character described which is suitable for removing oil-based fluids from absorbent articles.

Still another object of the present invention is to provide a system of the character described which is more convenient to use as compared to prior devices.

Yet another object of the invention is to provide a system of the character described which is more cost effective as compared to prior devices.

SUMMARY OF THE INVENTION

With regard to the foregoing and other objects, the present invention is directed to a system for recovering oil-based fluids from sorbent articles.

The system includes reusable sorbent articles having an inner hydrophobic foam core and at least one outer polymeric fiber cover having random fibers defining voids sufficient to entrain oil therein, a motor vehicle containing a power supply, and a self-balancing centrifuge having a housing and connected to the power supply for powered operation thereof. The centrifuge is positioned on the vehicle for transport to a remote site containing the reusable the sorbent articles, the centrifuge including a housing cover and a rotatable basket received within an interior portion of the centrifuge defined by the housing and cover and configured for receiving a plurality of the sorbent articles. Rotation of the basket during use of the system applies centrifugal forces to the sorbent articles for extractive removal of oil-based fluids therefrom such that the fluids travel from the basket into an annular area between the basket and the housing. The system further includes a collection tank in flow communication with the annular area for receiving the fluids removed from the sorbent articles.

In another aspect, the invention provides a portable system for recovering oil-based fluids from sorbent articles containing oil-based fluids. The system includes a motor vehicle and a self-balancing centrifuge having a housing and a foraminous rotatable basket removably attached to a spindle in the housing, the centrifuge being attached to the vehicle for transport to a remote site the basket having a solid base having a mass sufficient to provide self-balancing rotation of the basket and the basket being configured for receiving a plurality of the sorbent articles therein. Rotation of the centrifuge basket applies sufficient centrifugal force to the sorbent articles to cause removal of oil-based fluids therefrom such that the fluids travel from the basket into an annular area between the basket and the housing and from the housing to a fluid recovery tank and the sorbent articles are essentially fluid free.

In yet another aspect the invention provides a method for recovering oil from reusable sorbent articles. The method includes the steps of providing reusable sorbent articles having an inner hydrophobic foam core and at least one outer polymeric fiber cover having random fibers defining voids sufficient to entrain oil therein, exposing the sorbent articles to oil-based fluids for absorption of the fluids by the sorbent articles, and providing a system for treating the thus exposed sorbent articles.

The system includes a motor vehicle containing a power supply, a self-balancing centrifuge having a housing and connected to the power supply for powered operation thereof, the centrifuge being positioned on the vehicle for transport to a remote site containing the reusable the sorbent articles, the centrifuge including a housing cover and a rotatable basket received within an interior portion of the centrifuge defined by the housing and cover and configured for receiving a plurality of the sorbent articles.

The method further includes the steps of charging the thus exposed sorbent articles into the centrifuge and operating the centrifuge to rotate the basket thereby applying centrifugal forces to the sorbent articles for extractive removal of oil-based fluids therefrom such that the fluids travel from the basket into an annular area between the basket and the housing. A collection tank in flow communication with the annular area is provided for receiving the fluids removed from the sorbent articles and collecting the removed fluids therein. After the oil-based fluids are extracted from the sorbent articles, the articles are removed from the centrifuge for reuse.

The invention is particularly suitable for removing oil-based and other fluids from reusable sorbent pads of the type used to recover oil and gasoline spills from water and solid surfaces.

An important aspect of the invention is the mobility of the system which provides on-site recovery of oils and other hydrocarbon spills in an efficient and effective manner. The system thus reduces the need to transport relatively large numbers of drums or other receptacles filled with oil-soaked pads to a remote location for reconditioning of the pads. Further economies may be achieved in that the system lends itself to use by a service provider who can service a large number of users of reusable pads which are already being collected at a site. This may save the users of the pads time and significant expense.

For example, since the service provider comes to the site, the user need not store the pads in an environmentally sound area for later transport of the pads to a remote location for treatment. Also, as the service provider is able to use the system at multiple sites, considerable economies of scale may be achieved and the plant owner need not invest substantial sums of money in equipment to accomplish a task which a service provider may more economically provide.

BRIEF DESCRIPTION OF THE DRAWINGS

The above and other features and advantages of the present invention will become further known from the following detailed description considered in conjunction with the accompanying drawings in which.

DETAILED DESCRIPTION

Figure 1:
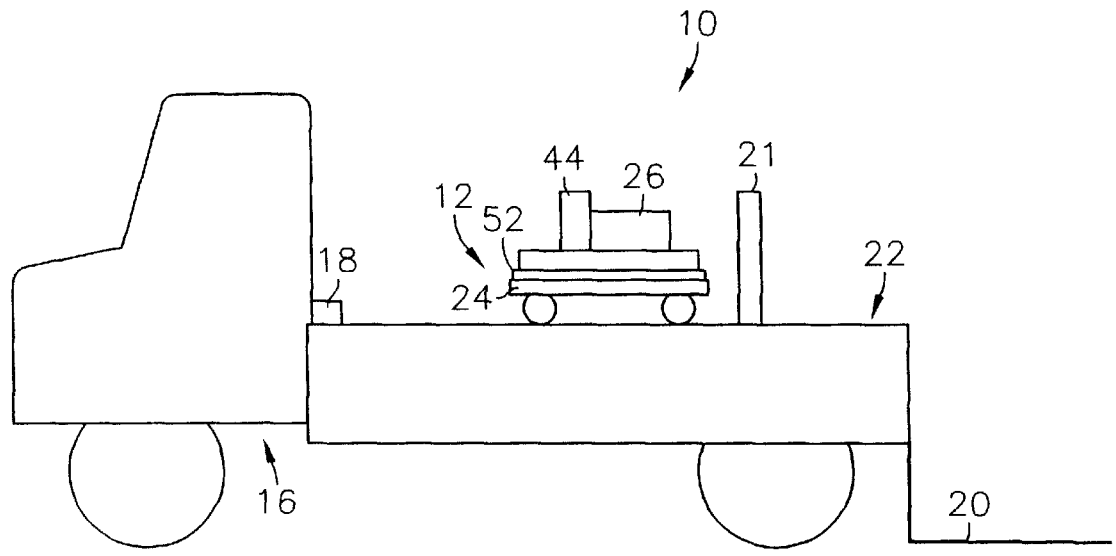
FIG. 1 is a left-side elevational view of a system for recovering oil-based fluids in accordance with the invention.
Figure 2:
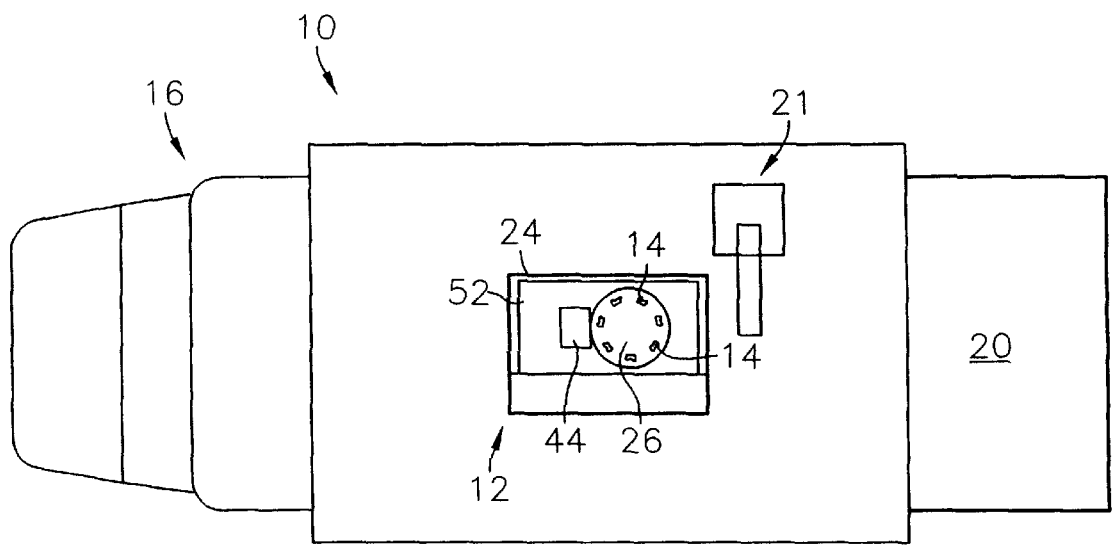
FIG. 2 is a top plan view of the system of FIG. 1.

With initial reference to FIGS. 1 and 2, there is shown a system 10 for recovering oil-based fluids in accordance with the invention. The system 10 includes separation apparatus 12 for removing liquids from absorbent articles or pads 14 loaded into the separation apparatus 12. A vehicle 16 is provided in conjunction with the apparatus 12 to enable the separation apparatus to be transported to various sites for treatment of pads 14 containing absorbed liquids to remove liquids, primarily oil-based fluids, from the pads and to recover the removed fluids. The vehicle 16 is preferably a self-propelled motor vehicle having an internal combustion or electric engine. Optionally, the vehicle may be provided as by a trailer which may be pulled by a tractor or truck or the like, or by a boat or a barge should the system be used in connection with a water spill. The vehicle 16 also contains a power source or generator 18 for providing power to run the separation apparatus 12. Alternatively, the generator 18, particularly if self-powered, may be mounted to the separation apparatus 12. The generator 18 may also be connected to a power source for vehicle 16 such as an alternator connected to the engine for the vehicle. As will be appreciated, the generator 18 is preferably constructed so as to avoid sparks and the like. The vehicle also preferably includes a powered lift gate 20 for lifting drums and an optional drum dumper 21 for dumping pads contained in the drums into the separation apparatus 12 for removal of fluids therefrom. The lift gate 20 may be used to lift drums to a bed 22 of the vehicle or for removing the separation apparatus 12 from the vehicle 16 if desired. For example, if the separation apparatus is provided on a wheeled cart 24, the lift gate 20 facilitates removal of the cart from the vehicle 16 and subsequent loading of the cart back onto the vehicle 16. The drum dumper 21 is preferably a motor driven unit having a support for receiving a drum and positioning the drum for dumping pads contained therein into the separation apparatus 12.

As used herein, the term "oil-based" refers to and includes hydrocarbon fluids, and primarily liquid-phase hydrocarbons such as crude oil and derivatives thereof, such as motor oil, lubricating oil, hydraulic fluids, transmission fluids, gasoline, diesel and the like.

The separation apparatus 12 functions to separate fluids from the pads 14, primarily oil-based liquids and small amounts of water, and is preferably provided as by a wringer or, most preferably a centrifuge 26. The centrifuge 26 is preferably an electrically operated stainless steel, explosion proof, self-balancing centrifuge which may be operated at rotational speeds of from about 500 to about 2,000 RPM. The preferred rotational speed is about 1500 to about 1750 rpm providing a G-force of up to about 1200 G's. Such a centrifuge having a diameter of from about 20 to about 30 inches and a basket depth of from about 10 to about 20 inches, and is available from Bock Engineering Products, Inc. of Toledo, Ohio.

Figure 3:
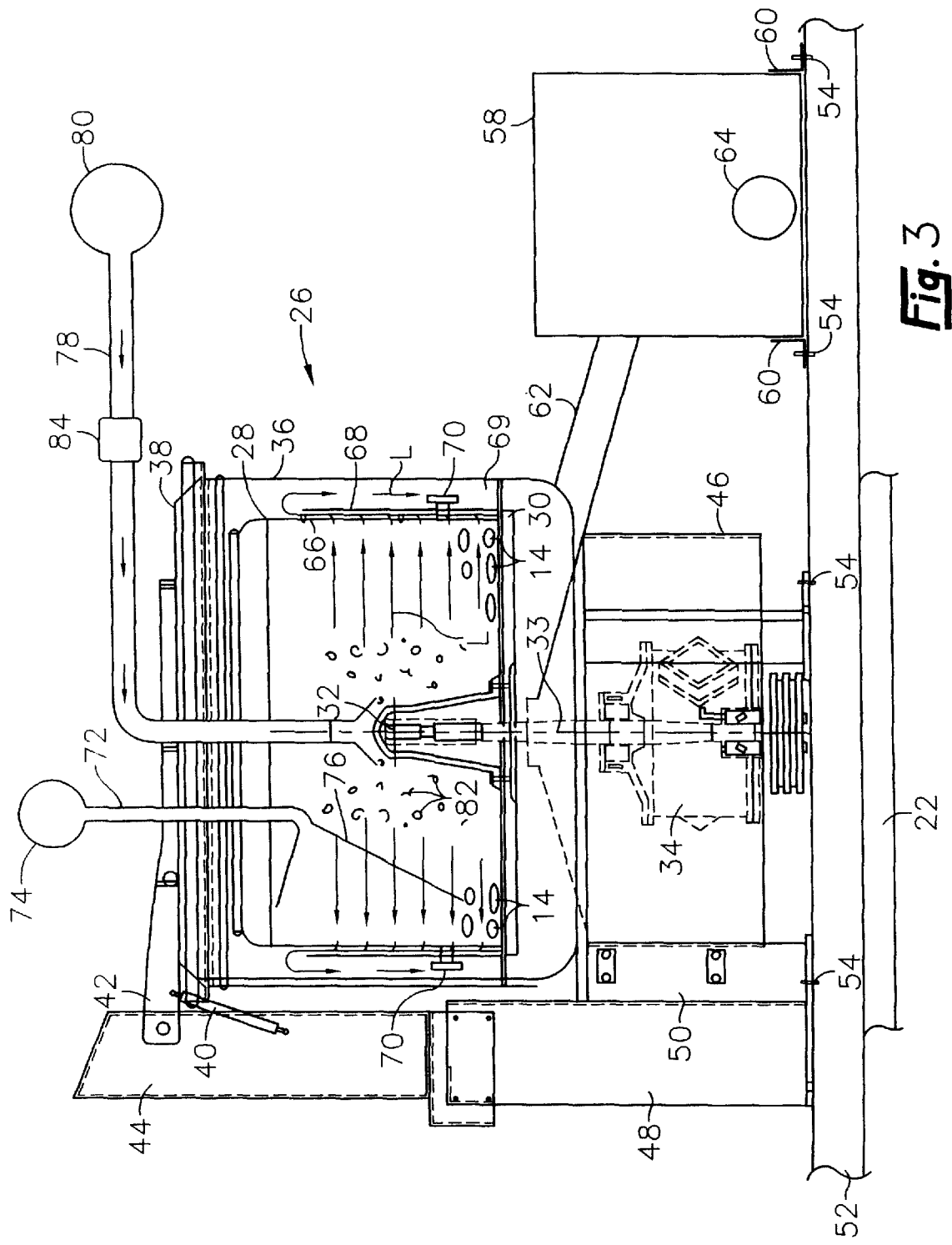
FIG. 3 is a side cross-sectional view of a centrifuge for use in the system of FIG. 1.

The centrifuge 26, as configured in accordance with the invention and shown in detail in FIG. 3, includes a foraminous basket preferably a double walled basket 28 having a solid bottom 30 mounted on a hexagonal ball and socket joint 32 at the upper end of shaft 33. The shaft 33 is associated with a drive unit 34 for spinning the shaft 33 and thus the basket 28 to apply centrifugal forces to pads 14 loaded into the basket 28. The basket 28 spins within a bowl-shaped housing 36 having a removable cover or lid 38 provided to seal the opening of the housing 36 and to cover the basket 28 during operation of the centrifuge 26 so that fluids removed from the pads 14 remain in the centrifuge. The lid 38 is preferably hinged and selectively openable as by gas springs 40 which extend between support arms 42 and a support column 44 to which the arms 42 are pivotally mounted. A protective metal housing 46 is preferably provided around the drive unit 34.

A power distribution unit 48 and control box 50 are associated with the drive unit 34 for providing electrical power to the drive unit and for controlling operation of the centrifuge. The centrifuge 26 is preferably mounted to a skid 52 which is mounted, as by fasteners such as bolts 54, to skid 52 or to the wheeled cart 24 (FIG. 1) which may be secured, as by chains, to the bed 22 of the vehicle during transport of the system from site to site.

A tank 58 is preferably provided for recovering fluids removed from the pads 14 during operation of the centrifuge. The tank 58 is preferably also mounted to the skid 52, such as by bolts 54 and L-shaped supports 60, and is in flow communication with the housing 36 as by conduit 62. The tank 58 may be drained as by a valved conduit 64 for recovery of the fluids for reuse or recycling thereof. In this regard, the fluid may be further treated, as by a skimmer, for separating the oil-based fluids from any water which may be recovered with the fluid.

As mentioned above, the basket 28 is preferably a double-walled basket having foraminous inner sidewalls 66 surrounded by a substantially solid outer sidewall 68. The outer sidewall 68 is preferably sealed against fluid flow by solid bottom 30 and has an opened upper end along the upper circumference thereof.

The double walled design advantageously enables the basket 28 to be charged with a solvent or washing liquid for enhanced cleaning of the pads. As will be appreciated, as the basket starts to spin, centrifugal forces cause the liquids to pass through the foraminous sidewall 66 into the annular area between the foraminous sidewall 66 and the solid outer sidewall 68 so that the fluid as shown by the arrows L flows over the opened upper end of sidewall 68 and into annular space 69 between the basket 28 and the housing 36. Handles or lifting lugs 70 may be provided on the outer surface of the sidewall 68 to aid in removing the basket from the housing 36.

To facilitate removal of oil-based fluids from the pads 14, it is preferred to introduce heat, a wash/rinse solution and/or air into the centrifuge. For example, a conduit 72 in flow communication with a source of a rinse/wash solution 74, such as water, preferably extends through the lid 38 for introducing a pressurized spray 76 of the rinse solution into the basket for rinsing of the pads. Suitable rinse/wash solutions include but are not limited to, detergent solutions, solvents and water.

The centrifuge 26 may be charged with a washing/rinse liquid for enhanced cleaning of the pads after removal of the bulk of the oil-based fluid from the pads by action of the centrifuge alone. If subsequently charged with such a solution, it is preferred to agitate the solution and pads to release solids and particulates from the pads. Accordingly, there is preferably provided a conduit 78 in flow communication with a source of pressurized gas 80, such as air, which extends centrally through the lid 38 to introduce a stream of gas bubbles 82 into the centrifuge for agitating the pads 14. For a centrifuge having a diameter of from about 20 to about 30 inches (i.e. from about 15 to about 49 gallons capacity), the spray is preferably introduced at a rate of from about 5 to about 10 gallons/min for a period of from about 3 to about 5 mins, and the gas stream is preferably introduced at a rate of from about 30 to about 50 cubic feet per minute (cfm) for a period of from about 3 to about 5 mins.

If desired, the gas introduced via the conduit 78 may be heated to a temperature of from about 30 to about 50° C. as by in-line heater 84 to raise the temperature of any liquid in the centrifuge 26 and/or to heat the pads 14 in order to decrease the viscosity of the oil-based fluids and thereby facilitate separation of the fluids from the pads 14. Cooling gas may also be introduced into the centrifuge via conduit 78 to cool the liquids and/or pads after treating the pads to remove oil-based fluids therefrom.

The pads 14 are typically reusable and may be used to contain and clean-up oil leaks and drips from floor surfaces, such as around machinery, and from water. The pads 14 may be provided in various shapes including, but not limited to, pads, mops, eels, socks and ribbons. The separation apparatus functions to separate liquids and particulate matter from the pads 14 and enables recovery of the liquids removed from the pads 14 so that the liquid may be collected and the pads rendered so that they are suitable for reuse to absorb additional liquids.

A preferred pad 14 is available from Hydrocarbon Recovery Products, Inc. of Newburgh, Ind. and is illustrated. Such pads are described in U.S. Pat. No. 5,227,072, entitled METHOD OF RECOVERING OIL-BASED FLUID and U.S. Pat. No. 5,229,006, entitled METHOD OF RECOVERING OIL-BASED FLUIDS AND APPARATUS incorporated herein by reference as if fully set forth. Other suitable pads include those described in U.S. Pat. No. 5,407,575, entitled OIL SPILL CLEANUP AND RECOVERY SYSTEM, and U.S. Pat. No. 5,403,478, entitled OIL-BASED FLUID ABSORBENT ARTICLE, incorporated herein by reference as if fully set forth.

Figure 4:
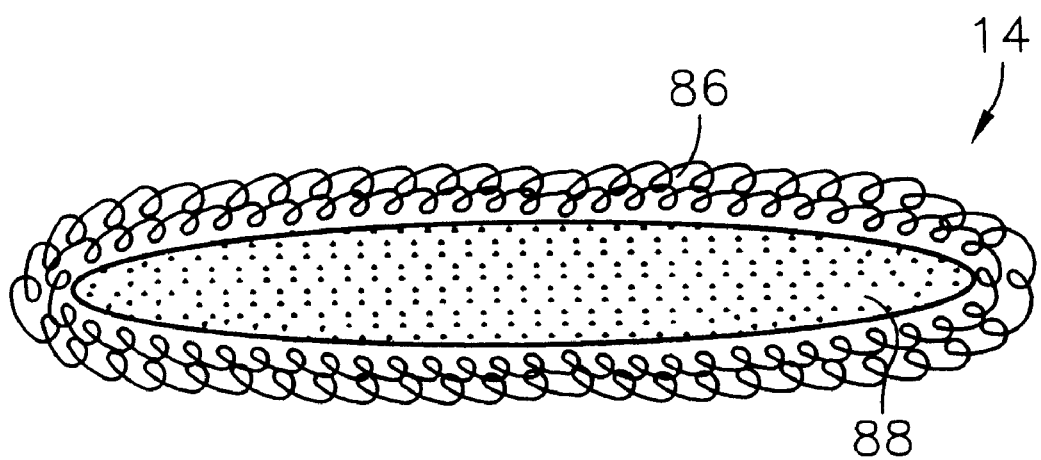
FIG. 4 is a cross-sectional view of a reusable sorbent pad according to the invention.

With reference to FIG. 4, such pads typically have at least one polymeric outer covering 86, e.g., polypropylene, polyester, nylon having an affinity for hydrocarbonous compounds, and an inner core 88 made of a solid foam material such as polyethylene, polypropylene and polyurethane. The foam material may be in the form of a block or pad of foam or may be granular foam particles. The outer covering 86 may be provided on one or both sides of foam inner core 88 as by the use of adhesives between the outer cover 86 and foam core 88. A preferred outer covering 86 is a nonwoven web of intertwined polymeric fibers which provide voids sufficient to entrain oil-based fluids therein. The outer covering way thus be a random fibrous web, a napped web, a felted web or any other suitable web having sufficient voids for soaking up oil-based fluids. Such pads are substantially hydrophobic and lipophilic and thus absorb oil-based fluids to the substantial exclusion of aqueous fluids. Thus, the removal of fluids from the pads as described herein typically involves the removal of primarily oil-based fluids with minor amounts, generally less than about 5% by volume, of water.

The pads preferably have an oil absorption capacity, based on the weight of oil per weight of pad, ranging from about 10 to about 25 times the weight of the pads. Higher or lower capacity pads may also be used with the recovery system as described herein. Likewise, foam articles or fibrous articles alone may be used to soak up oil-based fluid spills provided these sorbent articles lend themselves to the reconditioning as described herein.

The pads 14 may be advantageously employed to collect oil-based fluids from around machinery and from locations such as the surface of water or land wherein such fluids may have spilled. For example, in an industrial plant, the pads may be placed at strategic locations around machinery, such as at the bases of machines that leak hydraulic fluid or in oil storage locations. After soaking up the oil the pads are collected and treated using the system 10 described above to remove the absorbed oil-based fluid from the pads and thus recondition the pads for reuse. The removed oil may be collected, such as in a tank, for re-use or recycling and the treated pads returned to their strategic locations for further absorption of leaked fluids.

As will be appreciated in this scenario, numerous sites may exist in a plant where oil-based fluids may leak and need to be recovered. Conventionally, the pads are collected in large drums or barrels, such as 55 gallon drums, and the drums taken, as by forklift or truck, to a treatment station that is generally remote from many of the sites. The present invention advantageously provides a mobile system which may be taken to a plant and to various locations within the plant site on a periodic basis to facilitate treatment of the pads and eliminate the need to transport the drums to a remote location. This offers considerable economy in that one individual may transport the system to the various sites and treat the pads. This advantageously avoids the considerably more man-power/time as is required to move multiple drums of pads to a remote treatment location.

A typical cleaning cycle may include the following steps. Pads 14 are collected from a spill or clean-up site and loaded into the basket 28 of centrifuge 26. After loading the pads 14 into the basket 28, a flow of air from source 80 is heated by in-line heater 84 to a temperature in the range of from about 30 to about 50° C. The flow of hot air is discontinued and the centrifuge is operated for from about 5 to about 7 minutes at about 1750 rpm to remove the bulk of the oil-base fluid L which flows by gravity through conduit 62 into tank 58.

Once the flow of fluid has ceased, a rinse liquid from source 74 is sprayed into the centrifuge through conduit 72. During the spraying step, it is preferred to operate the centrifuge to remove the sprayed liquid either to the same tank 58 or to a separate water recovery tank. Spraying of the pads may be conducted from about 3 to about 5 minutes.

At the end of the spraying cycle, or in lieu of the spraying cycle, the centrifuge may be filled with a cleaning or rinse liquid, preferably containing a suitable detergents or surfactants including, but not limited to, anionic surfactants such as sulphonated alkylbenzenes, carboxylates, acylated protein hydrolysates, sulfonates, sulfates, phosphate esters and the like, non-ionic surfactants such as ethoxylates, carboxylic acid esters, carboxylic amides, polyalkylene oxide block copolymers and the like and cationic surfactants such as quarternary ammonium salts, amines and imidazolines for removing particulates and dust from the pads.

In addition to or in lieu of the use of detergents and/or surfactants for cleaning the pads, various biological cleaners may also be used. Such biological cleaners are particularly useful for removing residual hydrocarbon sludges and solids from the pads after removing the bulk of hydrocarbon liquids from the pads. A preferred biological cleaner is a detergent containing polyethylene glycol p-tert-octylphenyl ether such as the product available from Premium Supply Company, Inc. of El Campo, Tex. under the tradename

BUGS & SUDS NEUTRAL SURFACE

For a single walled basket 28 having only a foraminous sidewall 66, conduit 62 or tank 58 may be equipped with a valve to maintain the fluid in the basket 28. Once the basket is filled with fluid, the pads and fluid may be agitated as by the introduction of air from air source 80 through conduit 78 into the centrifuge basket 28. The agitation may be conducted from about 3 to about 5 minutes.

After soaking the pads in a rinse fluid, the pads may be spun dry as by rotating the centrifuge basket at about 1750 rpm. Because solid bottom 30 is substantially more massive than the sidewalls 66 and 68 of the basket 28 and because the bottom rotates below the pivot point on shaft 32, any unbalance caused by maldistribution of pads 14 in the basket 28 is compensated for in a manner similar to the operation of a gyroscope. Accordingly, no special foundations are required for mounting the centrifuge. Hence, the portability of the centrifuge is enhanced.

It will be appreciated that the skid 52 may be configured to accommodate the centrifuge 26, tank 58, power source 48, control unit 50, conduits 72 and 78, rinse solution source 74 and air source 80 so that a completely self-contained cleaning system is provided. However, one or more of the components may be separately, mounted on adjacent skids for easier handling and operation of the recovery system.

The system 10 may be used in various ways to facilitate removal of fluids from pads 14. For example, the system 10 may be driven on a periodic basis to each site at a plant where pads are stored and the pads treated at each site by loading the drums into the separation apparatus 12 mounted on the vehicle and operating the apparatus to remove fluids. This is advantageous, as a single apparatus may be used to remove fluids from pads used at various sites while avoiding the laborious task of transporting the pads to a remote location for off-site treatment of the pads. In another manner, the separation apparatus 12 may be off-loaded at a site and left and thereafter picked up after reconditioning the pads 14 at the site.

As will be appreciated, the portability of the system significantly reduces the labor and associated costs involved as it is more economical and convenient to transport the centrifuge to a variety of locations than to transport numerous drums from multiple locations to a fixed position centrifuge.

The foregoing description of certain exemplary embodiments of the present invention has been provided for purposes of illustration only, and it is understood that numerous modifications or alterations may be made in and to the illustrated embodiments without departing from the spirit and scope of the invention as defined in the following claims.

What is claimed is:

1. A system for recovering oil-based fluids, the system comprising reusable sorbent articles having an inner hydrophobic foam core and at least one outer polymeric fiber cover having random fibers defining voids sufficient to entrain oil therein, a motor vehicle containing a power supply, a self-balancing centrifuge having a housing and connected to the power supply for powered operation thereof, the centrifuge being positioned on the vehicle for transport to a remote site containing the reusable sorbent articles, the centrifuge including a housing cover and a rotatable basket received within an interior portion of the centrifuge defined by the housing and cover and configured for receiving a plurality of the sorbent articles, wherein rotation of the basket during use of the system applies centrifugal forces to the sorbent articles for extractive removal of oil-based fluids therefrom such that the fluids travel from the basket into an annular area between the basket and the housing, a spray conduit connected through the cover to a spray nozzle, the conduit and nozzle being in flow communication with a source of pressurized liquid for introducing a flow of liquid into the basket, and a collection tank in flow communication with the annular area for receiving the fluids removed from the sorbent articles.

2. The system of claim 1, wherein the basket comprises an inner foraminous sidewall and an outer substantially solid sidewall and a solid bottom portion.

3. The system of claim 1, further comprising an outer conduit connected through the cover to an inner conduit, the inner and outer conduits being in flow communication with a source of pressurized gas and the interior of the centrifuge for introducing a flow of gas into the basket.

4. The system of claim 3, wherein the conduit further includes a heater for heating the gas.

5. The system of claim 3, wherein the gas comprises air.

6. The system of claim 1, further comprising a heater for raising the temperature of oil-based fluids and/or to heat the sorbent articles in the centrifuge in order to reduce the viscosity of oil-based fluids therein.

7. The system of claim 1, wherein the liquid comprises water.

8. The system of claim 1, wherein the centrifuge is fixedly attached to the vehicle.

9. The system of claim 1, further comprising a wheeled cart releasably mountable to the vehicle, the centrifuge being fixedly mounted to the wheeled cart.

10. A portable system for recovering oil-based fluids from sorbent articles containing oil-based fluids, the system comprising a motor vehicle and a self-balancing centrifuge having a housing, a conduit in flow communication with a source of pressurized liquid for introducing a flow of liquid into the centrifuge, and a foraminous rotatable basket removably attached to a spindle in the housing, the centrifuge being attached to the vehicle for transport to a remote site, the basket having a solid base having a mass sufficient to provide self-balancing rotation of the basket and the basket being configured for receiving a plurality of the sorbent articles therein, wherein rotation of the centrifuge basket applies sufficient centrifugal force to the sorbent articles to cause removal of oil-based fluids therefrom such that the fluids travel from the basket into an annular area between the basket and the housing and from the housing to a fluid recovery tank and the sorbent articles are essentially fluid free.

11. The system of claim 10, further comprising a conduit in flow communication with a source of pressurized gas and the basket for introducing a flow of gas into the centrifuge.

12. The system of claim 10, further comprising a heater for raising the temperature of oil-based fluids and/or to heat the sorbent articles in the centrifuge in order to reduce the viscosity of oil-based fluids therein.

13. The system of claim 10, wherein the centrifuge is fixedly connected to the vehicle.

14. The system of claim 10, further comprising a wheeled cart releasably mountable to the vehicle, the centrifuge being fixedly mounted to the wheeled cart.

* * * * *